M. A. WARNER.
FOOD TRAY FOR STEAM COOKERS.
APPLICATION FILED OCT. 16, 1908.
931,533.  Patented Aug. 17, 1909.
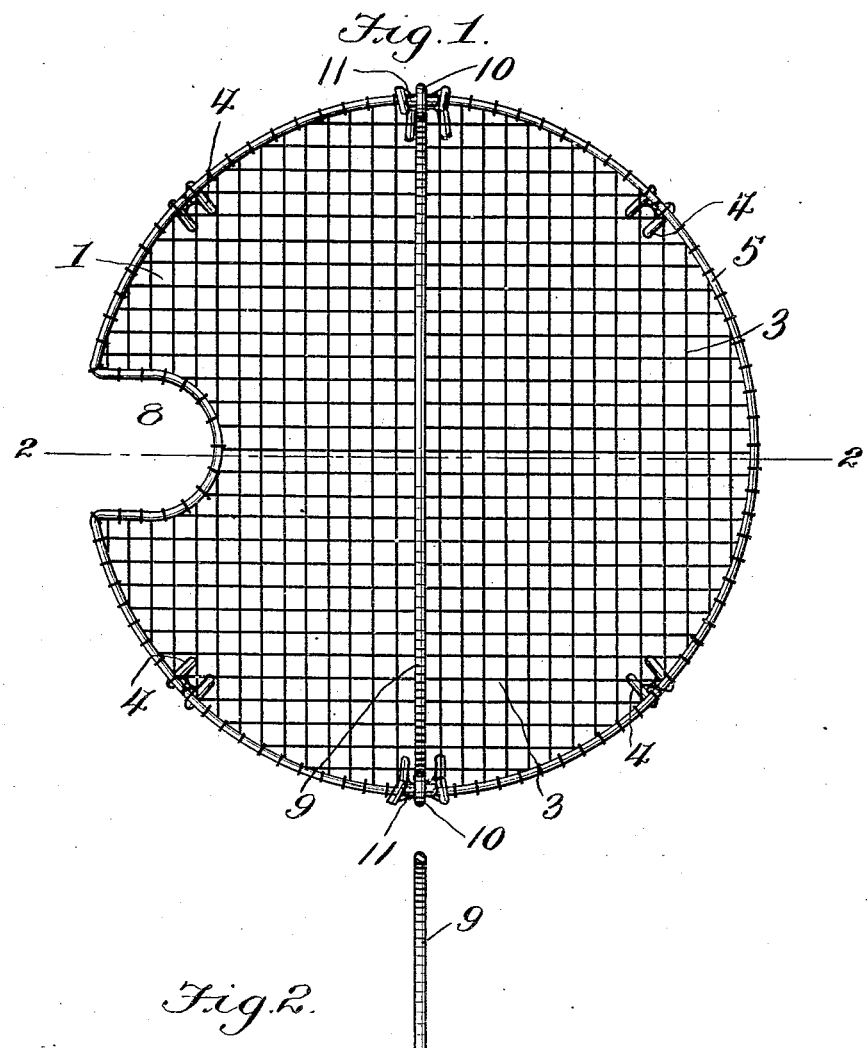
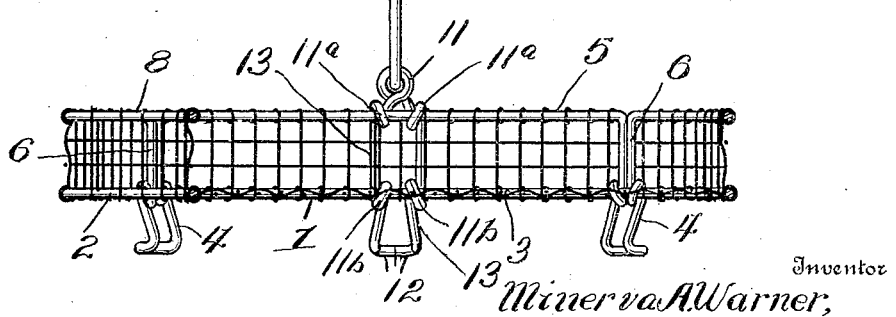
Witnesses
J. T. L. Wright
C. C. Hines
Inventor
Minerva A. Warner,
By Victor J. Evans,
Attorney

UNITED STATES PATENT OFFICE.

MINERVA A. WARNER, OF EDENTON, NORTH CAROLINA.

FOOD-TRAY FOR STEAM-COOKERS.

No. 931,533.     Specification of Letters Patent.     Patented Aug. 17, 1909.

Application filed October 16, 1908. Serial No. 458,071.

*To all whom it may concern:*

Be it known that I, MINERVA A. WARNER, a citizen of the United States, residing at Edenton, in the county of Chowan and State of North Carolina, have invented new and useful Improvements in Food-Trays for Steam-Cookers, of which the following is a specification.

This invention relates to trays for steam cookers, the object of the invention being to provide a food supporting tray which may be applied within the cooker to support the food above the bottom thereof, so as to secure an effective circulation of the steam on all sides about the food to thoroughly cook the same, and to prevent the food from being moistened or soaked by the water of condensation gravitating to the bottom of the steamer.

A further object of the invention is to provide a tray of this character whereby the food may be inserted within and removed from the cooker without liability of crushing or breaking the food when of a solid nature, and which is simple of construction and susceptible of being manufactured and sold at a comparatively low cost.

The invention consists of the features of construction, combination and arrangement of parts hereinafter fully described and claimed, reference being had to the accompanying drawing, in which:—

Figure 1 is a top plan view of a steam cooker embodying my invention. Fig. 2 is a vertical diametrical section thereof on line 2—2 of Fig. 1.

The tray is of circular or other suitable form to fit closely within the steamer and comprises a bottom 1 formed of an outer frame ring 2, preferably of wire, and a foraminous or reticulated filling 3 stretched across the opening in the ring. Secured to this frame ring 2 at suitable intervals around the same are supporting legs 4 to hold the tray elevated above the bottom of the steamer on which the legs are designed to rest. Each of these legs consists of a substantially U-shaped piece of wire having the free ends of its arms hooked or otherwise formed to engage the ring 2 and its lower return portion bent at a right angle to form a foot piece.

The side wall of the tray is composed of a rim 5 formed of a ring of wire corresponding in size with the ring 2 and connected therewith at suitable intervals by vertical coupling arms or portions 6 composed of the extended ends of the wire of each ring which extend upward or downward as the case may be and are secured to the other ring. The side wall is completed by a network or filling 7 of foraminous or reticulated material, such as crossed strands of wire.

The tray is provided at one side with a U-shaped opening or recess 8 formed by bent portions of the rings to receive and permit passage of the nozzle or vent pipe of the steamer through which the confined steam escapes.

The tray is provided with a bail handle 9, the ends of which are bent into eyes 10 which engage eyes 11 at diametrically opposite sides of the rim ring 5. These eyes are formed by the upper or intermediate portions of wires which are bent into loops 11$^a$ and 11$^b$ engaging the rings 2 and 5 or are soldered or otherwise fastened thereto, and are thence extended downwardly and bent to form auxiliary supporting feet 12 which are spaced equidistantly with the feet 4. The portions of these wires connecting the rings form coupling arms or members 13 which coöperate with the coupling arms 6 to firmly and strongly connect the bottom and rim ring together.

In the use of the device in steaming food, the food is placed within the tray and rests upon the perforated bottom 3, and then the tray is elevated by the handle 9 and placed within the steamer so that it will be supported in an elevated position above and from the bottom of the steamer by the legs 4 and 12. The steam will thus be caused to circulate upwardly through the perforated bottom and laterally through the perforated side wall of the tray, and will thus come in contact with all sides of the food, whereby the latter will be quickly and thoroughly cooked. As the tray will hold the food elevated above the bottom of the steamer, the food cannot become moistened or soaked by the water of condensation from the steam gravitating downward to the bottom of the steamer. When the food is cooked, the tray is lifted out of the steamer by the handle 9, whereby the food may be removed in an intact condition or without becoming crushed or broken, a manifest advantage in steaming puddings and other solid foods.

It is to be understood that the tray may be constructed of wire, tin, granite ware or aluminum, foraminous or not, as desired, and that the recess or opening may be variously arranged to suit the arrangement of the steam vent pipe or tube of the cooler. Also the tray can be constructed with or without a standing rim or side wall.

Having thus fully described the invention, what is claimed as new is:—

A food containing tray for steam cookers comprising a foraminous bottom formed of a wire frame ring and a filling of reticulated material, a rim formed of wire, connecting arms between the frame ring and rim, a filling of foraminous material between the rim and ring, the bottom and side wall of the tray thus formed being provided with a recess at one side, legs projecting below the bottom, certain of said legs being arranged to form arms coupling the ring and rim and having eyes projecting above the rim, and a bail handle connected with said eyes.

In testimony whereof I affix my signature in presence of two witnesses.

MINERVA A. WARNER.

Witnesses:
O. W. LANE,
W. D. PRUDEN.